United States Patent
Files et al.

(10) Patent No.: US 11,442,527 B2
(45) Date of Patent: Sep. 13, 2022

(54) SYSTEM AND METHOD FOR TURNING OFF A DISPLAY DEVICE BASED ON ENERGY USAGE

(71) Applicant: DELL PRODUCTS, LP, Round Rock, TX (US)

(72) Inventors: Jace W. Files, Round Rock, TX (US); John T. Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 42 days.

(21) Appl. No.: 17/090,049

(22) Filed: Nov. 5, 2020

(65) Prior Publication Data

US 2022/0137696 A1    May 5, 2022

(51) Int. Cl.
   *G06F 1/32* (2019.01)
   *G06F 1/3234* (2019.01)
   *G06F 1/3218* (2019.01)

(52) U.S. Cl.
   CPC .......... *G06F 1/3265* (2013.01); *G06F 1/3218* (2013.01); *G09G 2330/022* (2013.01); *G09G 2330/027* (2013.01)

(58) Field of Classification Search
   CPC ....... G06F 1/3265; G06F 1/3218; G09G 3/20; G09G 2330/022; G09G 2330/027
   USPC ........................................................ 713/323
   See application file for complete search history.

(56) References Cited

U.S. PATENT DOCUMENTS

| | | | | |
|---|---|---|---|---|
| 5,991,827 | A * | 11/1999 | Ellenby | G05B 19/042 710/16 |
| 6,509,911 | B1 * | 1/2003 | Shimotono | G06F 1/3265 715/761 |
| 6,650,322 | B2 * | 11/2003 | Dai | G06F 1/3203 345/212 |
| 10,614,750 | B2 * | 4/2020 | Drzaic | G09G 3/30 |
| 2003/0051182 | A1 * | 3/2003 | Tsirkel | G06F 1/3265 713/320 |
| 2005/0052446 | A1 * | 3/2005 | Plut | G06F 1/3218 345/211 |
| 2006/0136762 | A1 * | 6/2006 | Yoshioka | G09G 3/3406 713/320 |
| 2006/0250525 | A1 * | 11/2006 | Plut | G06F 1/3203 348/618 |
| 2008/0165115 | A1 * | 7/2008 | Herz | G06F 1/3265 345/102 |
| 2011/0154080 | A1 * | 6/2011 | Wang | G06F 1/3228 711/135 |
| 2013/0091369 | A1 * | 4/2013 | Shih | G06F 1/3231 713/323 |

(Continued)

*Primary Examiner* — Chun Cao
(74) *Attorney, Agent, or Firm* — Larson Newman, LLP (57) ABSTRACT

An information handling system includes a display device, a user input device, and a processor. The processor communicates with the display device and with the user input device. The processor detects whether the user input device is in an idle state. In response to an initial detection of the user input device being in the idle state, the processor continually determines a power consumption of the display device. While the power consumption is continually determined, the processor determines whether a predetermined amount of energy has been consumed. In response to a predetermined amount of energy being consumed, the processor turns off the display device.

14 Claims, 3 Drawing Sheets

(56) References Cited

U.S. PATENT DOCUMENTS

| | | | |
|---|---|---|---|
| 2014/0306973 A1* | 10/2014 | Yang | G09G 5/00 |
| | | | 345/522 |
| 2015/0100802 A1* | 4/2015 | Thomas | G06F 1/3265 |
| | | | 713/320 |
| 2018/0047338 A1 | 2/2018 | Knepper et al. | |
| 2018/0120922 A1 | 5/2018 | Hsu et al. | |
| 2019/0033948 A1 | 1/2019 | Sultenfuss et al. | |
| 2019/0080639 A1 | 3/2019 | Peana et al. | |
| 2020/0103717 A1 | 4/2020 | Chen et al. | |

\* cited by examiner

SYSTEM AND METHOD FOR TURNING OFF A DISPLAY DEVICE BASED ON ENERGY USAGE

FIELD OF THE DISCLOSURE

The present disclosure generally relates to information handling systems, and more particularly relates to turning off a display device based on energy usage.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a processor that detects whether a user input device is in an idle state. In response to an initial detection of the user input device being in the idle state, the processor may continually determine a power consumption of a display device. While the power consumption is continually determined, the processor may determine whether a predetermined amount of energy has been consumed. In response to a predetermined amount of energy being consumed, the processor may turn off the display device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
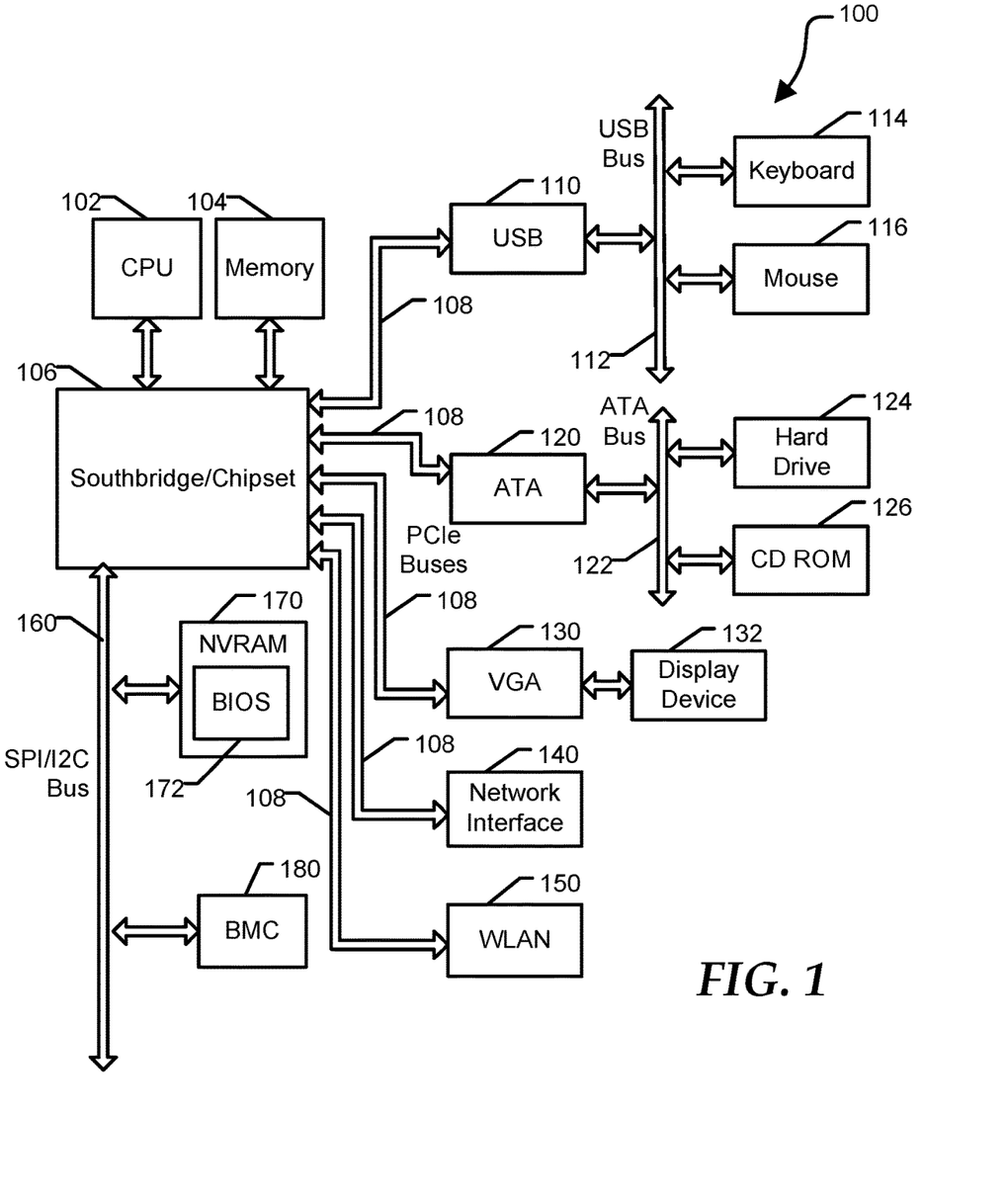
FIG. 1 is a block diagram of a general information handling system according to an embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more buses operable to transmit communications between the various hardware components.

Information handling system 100 including a processor 102, a memory 104, a southbridge/chipset 106, one or more PCIe buses 108, a universal serial bus (USB) controller 110, a USB 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more buses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional buses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of southbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

In an example, information handling system 100 may be any suitable device including, but not limited to, information handling system 100 and servers 112, 114, and 116 of FIG. 1. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
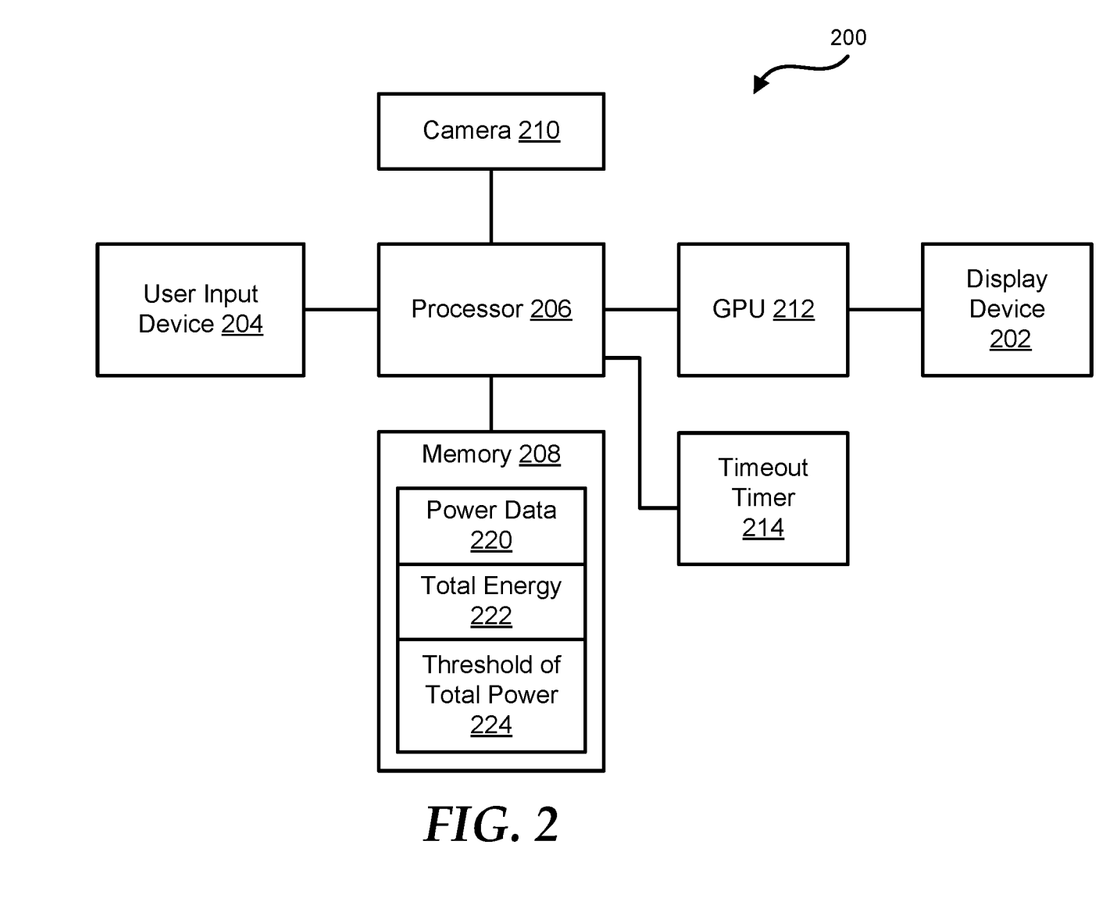
FIG. 2 is a diagram of a portion of an information handling system according to at least one embodiment of the present disclosure.

FIG. 2 illustrates an information handling system 200 including a display device 202, a user input device 204, a processor 206, a memory 208, a camera 210, a graphical processing unit (GPU) 212, and a timeout timer 214 according to at least one embodiment of the present disclosure. In an example, processor 206 may communicate with user input device 204, memory 208, camera 210, and GPU 212. Processor 206 may also communicate with display device 202 via GPU 212. In certain examples, processor 206 may be any suitable processor including, but not limited to, CPU 102 of FIG. 1. Display device 202 may be any suitable display device including, but not limited to, display device 132 of FIG. 1. User input device 204 may be any suitable device or component to enable a user to provide inputs to information handling system 200 including, but not limited to, a keyboard, a pointing device, and a pen or finger on a touch screen. In an example, information handling system 200 may include additional components without varying from the scope of this disclosure.

During operation of information handling system 200, display device 202 may be the highest energy consumption component within the information handling system. In an example, information handling system 200 may be a laptop computer, such as a notebook computer, and the display panel of display device 202 may draw a lot of power. In certain examples, a display panel of display device 202 may be any suitable display including, but not limited to, a liquid crystal display (LCD), and an organic light emitting diode (OLED) display. The display panel of display device 202 may be the highest energy consumption component in information handling system 200, especially when the information handling system is a laptop computer. In fact, as more processing is moved from information handling system 200 to an edge or cloud component, a percentage of the total energy consumption within information handling system 200 by the display panel may continue to increase. This energy consumption by the display panel of display device 202 may consume a large percentage of battery life of information handling system 200.

In an example, if display device 202 includes an OLED display panel, the power consumption of the display device may be highly dependent on the content displayed on the display panel. For example, if display device 202 displays a black or dark screen the power consumption by the display device may be orders of magnitude less than when the display device displays a full white screen. In an example, display device 202 may consume any suitable amount of power while displaying a block or dark screen including, but not limited to, around 100 mW. Display device 202 may consume any suitable amount of power while displaying a full white screen including, but not limited to, 7 W.

In previous information handling systems, the display device may be turned off based on an amount of idle time from a user input. For example, in previous information handling systems, in response to a period of inactivity being determined to equal a predetermined amount of time, a timeout timer may cause the display device to turn off to save power within the information handling system. However, if the display device is displaying a full white screen, the display device may consume a substantially larger amount of energy during the timeout period as compared to the display device displaying a black or dark screen. Thus, information handling system 200 may be improved by display device 202 consuming less energy and conserving battery life in the information handling system by turning of the display device based on energy usage and not solely on a timeout period of inactivity.

In an example, as a user utilizes user input device 204, a component within information handling system 200, such as processor 206, may monitor the user input device to determine a period of inactivity as determined by timeout timer 214. For example, in response to processor 206 determining that user input device 204 is idle, the processor may start timeout timer 214. In an example, each time processor determines that user input device 204 is no longer idle, the processor may reset timeout timer 214.

In certain examples, timeout timer 214 may be set to a predetermined amount of time for user input device 204 to remain idle before display device 202 is shut off. For example, the predetermined amount of time may be any suitable amount of time including, but not limited to, thirty seconds, two minutes, three minutes, five minutes, and ten minutes. In an example, the predetermined amount of time may be set by the user of information handling system 200. Additionally, timeout timer 214 may include two different settings or two different predetermined amounts of time. For example, timeout timer 214 may be set to a first predetermined amount of time if information handling system 200 is plugged in to an alternating current (AC) power source, and may be set to a second predetermined amount of time if the information handling system is utilizing a battery. In certain examples, the first setting may include a larger amount of time as compared to the second setting.

Processor 206 may perform one or more operations to determine whether to shut off display device 202. In response to determining that user input device 204 is idle, processor 206 may determine an instantaneous power drawn by display device 202. In an example, processor 206 may continue to determine the instantaneous power drawn by display device 202. Based on the determined instantaneous power amounts, processor 206 may calculate or determine an amount of energy consumed by display device 202 at predetermined intervals. For example, processor 206 may start an energy sample timer. In an example, the energy sample timer may include a predetermined amount of time between consecutive calculations of energy consumed by display device 202. In certain examples, the predetermined amount of time for the energy sample timer may be any suitable amount of time including, but not limited to, an half of a second, one second, two seconds, four seconds, and five seconds.

In an example, processor 206 may continue to determine the instantaneous power drawn by display device 202 until one or more suitable events occur. The suitable events may include, but are not limited to, a predetermined amount of energy has be consumed by display device 202, timeout timer 214 has expired, and a user is no longer present in front of information handling system 200. In an example, timeout timer 214 may be set to any suitable amount of time including, but not limited to, 30 seconds, 60 seconds, and 2 minutes.

Processor 206 may calculate or determine the total amount of energy consumed by display device 202 in any suitable manner and utilizing any suitable formula or set of operations. For example, processor 206 may calculate the total amount of energy consumed by multiplying an instantaneous amount of power by a length of time that power has been drawn. For example, processor 206 may determine a power curve based on one or more instantaneous amounts power drawn by display device 202, and the amount of energy consumed over time may be estimated based on the instantaneous amounts of power. In an example, processor 206 may store the instantaneous amounts of power may be stored as data 220 for a power curve and the energy may be determined or estimated by an area under the power curve.

In an example, each time the energy timer expires and is reset, processor 206 may determine whether a total amount of energy consumed by display device 202 is greater than a threshold amount of energy 224. If the total amount of energy consumed by display device 202 is not greater than the threshold amount of energy 224, processor 206 may determine whether to shut off the display device based on whether timeout timer 214 has expired or whether a user is no longer present. In an example, threshold amount of energy 224 may be any suitable amount of energy set by a user and stored in memory 208. For example, threshold amount of energy 224 may be set to any amount of energy including, but not limited to, 10 milli-Watt hours (mWh), 15 mWh, 20 mWh, and 30 mWh.

Processor 206 may perform one or more suitable calculations to determine the amount of energy consumed by display device 202. For example, processor 206 may determine an amount of energy consumed between sample periods of the instantaneous power determinations utilizing equation 1 below:

$$X_1 = (t_2 - t_1) * (P_1 + P_2)/2 \qquad \text{EQ. 1}$$

In equation 1 above, $X_1$ is the amount of energy, $t_1$ is a first time measurement, $t_2$ is a second time measurement, $P_1$ is the power drawn at the first time measurement, and $P_2$ is the power drawn at the second time measurement.

Processor 206 may calculate the total energy consumed by display device 202 based on the amount of energy consumed between each set of consecutive sample periods, as shown in equation 2 below:

$$X_{TOTAL} = X_1 + X_2 + \ldots + X_n \qquad \text{EQ. 2}$$

In equation 2 above, $X_{TOTAL}$ is the total amount of energy, $X_1$ is a first amount of energy, $X_2$ is a second amount of energy, and $X_n$ is an nth amount of energy. In an example, processor 206 may compare the total amount of energy to threshold amount of energy 224 every time a new sample period occurs. If the total amount of energy consumed is greater than threshold amount of energy 224, processor 206 may shut off display device 202. In an example, processor 206 may send a signal to GPU 212 to turn off display device 202.

In an example, the comparison of the total amount of energy to threshold amount of energy 224 may enable display device 202 remain on different amounts of time before being shut off based on the brightness of a screen of the display device. For example, a display timeout T may varying based on an average amount of power $P_{AVG}$ drawn by display device 202 and a target amount of power $X_{TARGET}$ to be consumed by the display device, as shown in equation 3 below:

$$\text{timeout } T = X_{TARGET}/P_{AVG} \qquad \text{EQ. 3}$$

Processor 206 may calculate the average amount of power $P_{AVG}$ drawn by display device 202 in any suitable manner including, but not limited to, equation 4 below:

$$P_{AVG} = X_{TOTAL}/(t_n - t_0) \qquad \text{EQ. 4}$$

In equation 4, $t_n$ is an nth sample period, and $t_0$ is an initial sample period. In an example, processor 206 may leave display device 202 with its normal brightness until the target amount of power $X_{TARGET}$ has been consumed by the display device, and then shut off the display device. In certain examples, processor 206 may average an amount of power drawn by display device 202 if the screen is not static. For example, events that may cause the screen not to be static include, but are not limited to, an advertisement or set of advertisements being displayed, a video being displayed, and a power point slide show being displayed.

Based on equations 3 and 4 above, exemplary amounts of time for display device 202 being turned off will be give based on total energy 222 being set to 20 mWh and timeout timer 214 being set to 60 seconds. If display device 202 includes a screen with a mostly white background, the display device may draw 7 W of power and processor 206 may turn off the display device in 10.3 seconds. If display device 202 includes a screen with a 50% On Pixel Ratio (OPR), the display device may draw 3.5 W of power and processor 206 may turn off the display device in 20.6 seconds. If display device 202 includes a screen with a 10% OPR, the display device may draw 500 mW of power and processor 206 may turn off the display device when timeout time 214 expires.

In another example, processor 206 may linear dim, via GPU 212, display device 202 as the period of inactivity of user input device 204 increases until the target amount of power $X_{TARGET}$ has been consumed, and then shut off the display device. In this example, if user input device 204 becomes activity again before the target amount of power $X_{TARGET}$ has been consumed, processor 206 may utilize GPU 212 to return display device 202 to its original brightness level.

In an example, processor 206 may linear dim, via GPU 212, display device 202 as the period of inactivity of user input device 204 increases until a threshold percentage of power 224 is consumed. In response to the threshold percentage of power 224 is consumed, processor 206 may logarithmically dim, via GPU 212, display device 202 until the target amount of power $X_{TARGET}$ has been consumed, at which point the display device is shut off. In an example, processor 206 may utilize equations 5, 6, and 7 to control the logarithmic dimming of display device 202.

$$T_{DIMSTART} = P_{THRESHOLD} * T = P_{THRESHOLD} * X_{TARGET}/P_{AVG} \qquad \text{EQ. 5}$$

In an example, at time $t = T_{DIMSTART}$ processor 206 may begin to dim display device 202.

$$\text{Brightness} = L_{START} * \ln(T_{END} - t) \qquad \text{EQ. 6}$$

In an example, if $T_{DIMSTART}$ is equal to 1, $X_{DIM}$ which is a amount of dimming of the display device may be calculated:

$$X_{DIM} = L_{START}(T_{END} * \ln(T_{END}) - T_{END} - 1) \qquad \text{EQ. 7}$$

In equations 5, 6, and 7, $T_{DIMSTART}$ is a time when the logarithmic dimming begins, $P_{THRESHOLD}$ is the percentage of total power, $X_{TARGET}$ is the target amount of power to be consumed by display device 202, $P_{AVG}$ is the average amount of power drawn by the display device, $L_{START}$ is the starting brightness when the logarithmic dimming begins, $T_{END}$ is the time when the display device is fully shut off, $X_{DIM}$ is a amount of dimming of the display device, and $P_{REMAINING}$ is the percentage of total power remaining after the percentage threshold is reached.

Threshold percentage of power 224, $P_{THRESHOLD}$, may be any suitable percentage of the target amount of power $X_{TARGET}$ including, but not limited to, 75%, 80%, and 85%. In this example, if user input device 204 becomes activity again before the target amount of power $X_{TARGET}$ has been consumed, processor 206 may utilize GPU 212 to return display device 202 to its original brightness level.

In an example, display device 202 may be dimmed at different rates based on a specified time of timeout timer 214 and the brightness of the screen. For example, if timeout timer 214 is set to 30 seconds, a full white screen of display device 202 would dim relatively faster than a screen with 50% OPR image. However, display device 202 will utilize the same amount of energy over the length of time set by timeout timer 214.

Referring now to user presence detection, processor 206 may perform one or more operations to determine whether to shut off display device 202 based on whether a user is present. For example, processor 206 may determine whether a user presence detect operation is enabled. In an example, the user presence detect operation may be any suitable operation or set of operations performed by one or more devices of information handling system 200 to determine whether a user is in front of the information handling system. The devices of information handling system 200 that may perform the user presence detect operations may include, but are not limited to, processor 206 executing a program, and an application specific integrated circuit (ASIC).

In an example, camera 210 may capture an image, which may or may not have the user in the image. Camera 210 may provide the image to a detection circuitry of information handling system 200. In certain examples, any suitable detection circuitry may perform one or more operations to determine whether the image from the camera includes a user of the information handling system. For example, the detection circuitry may include, but is not limited to, an application executed by processor 200, and an application specific integrated circuit (ASIC) within information handling system 200. In response to detection circuitry determining that a user is not present, the detection circuitry may provide a signal to processor 206, which in turn may shut off display device 202.

As described herein, utilizing energy usage of display device 202 to determine when to shut off the display device may improve information handling system 200 reducing an amount of energy consumed by the display device.

Figure 3:
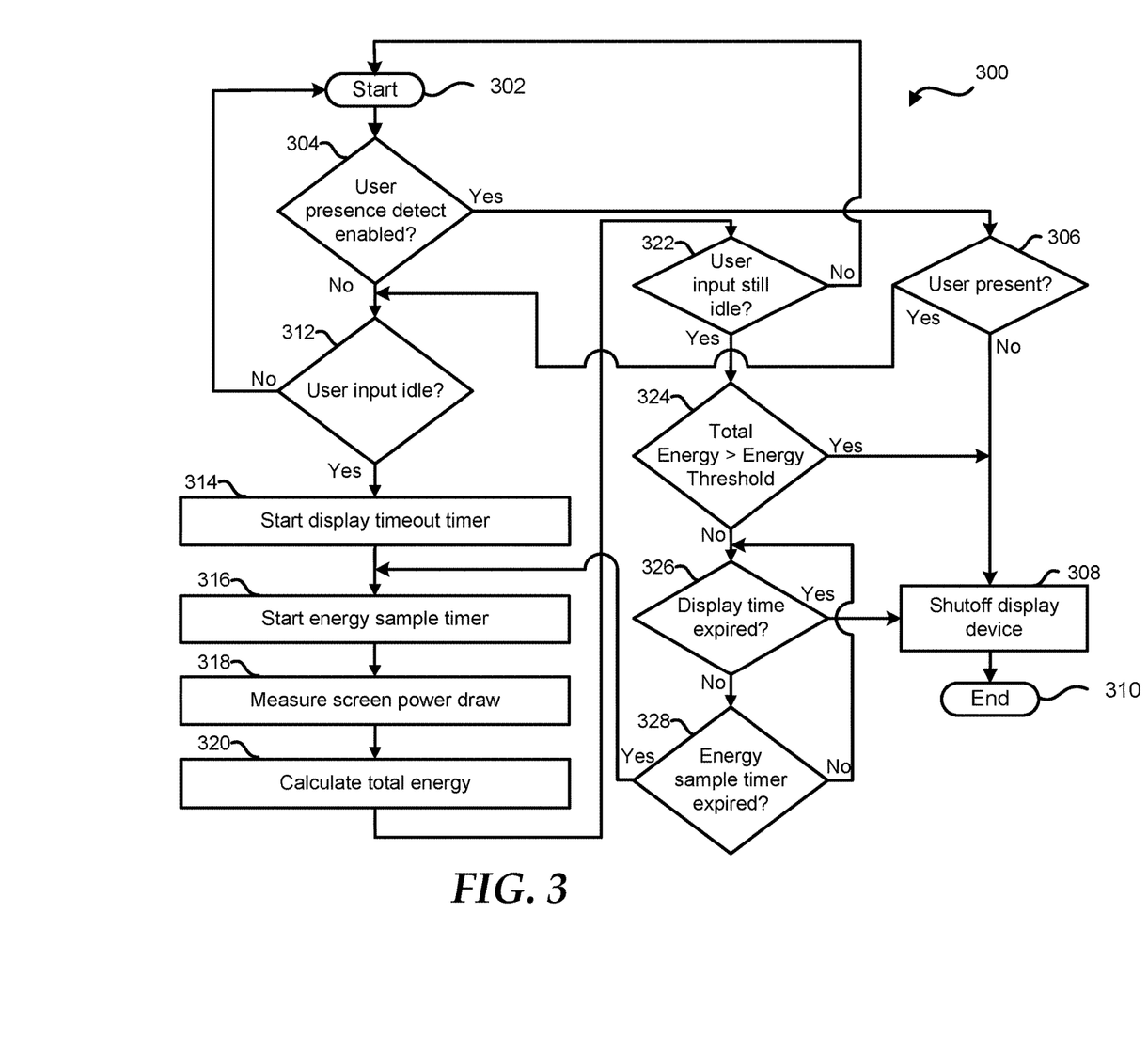
FIG. 3 is a flow diagram of a method for turning off a display device based on energy usage according to at least one embodiment of the present disclosure.

FIG. 3 shows a flow diagram of a method 300 for turning of a display device based on energy usage according to at least one embodiment of the present disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, by information handling system 100 depicted in FIG. 1 or any other type of system, controller, device, module, processor, or any combination thereof, operable to employ all, or portions of, the method of FIG. 3.

At block 304, a determination is made whether a user presence detect operation is enabled. In an example, the user presence detect operation may be any suitable operation or set of operations performed by one or more devices of an information handling system to determine whether a user is in front of the information handling system. If the user presence detect operation is not enabled, the flow continues as stated below at block 312. If the user presence detect operation is enable, the flow continues at block 306.

At block 306, a determination is made whether the user of the information handling system is present. In an example, a camera of the information handling system may capture an image, which may or may not have the user in the image. In certain examples, any suitable detection circuitry may perform one or more operations to determine whether the image from the camera includes a user of the information handling system. For example, the detection circuitry may include, but is not limited to, an application executed by a processor of the information handling system, and an application specific integrated circuit (ASIC).

If a user is not present, a display device of the information handling system is shut off at block 308, and the method ends at block 310. However, if a user is present the flow continues at block 312, and a determination is made whether a user input is idle. In an example, the user input may be any suitable input from a user device including, but not limited to, a keyboard, a mouse or other pointing device, and a touch screen. If the user input is not idle, the flow continues as stated above at block 302.

If the user input is idle, a display timeout timer is started at block 314. In an example, a display timeout timer may be a predetermined amount of time for the user input to remain idle before the display device is shut off. For example, the predetermined amount of time may be any suitable amount of time including, but not limited to, thirty seconds, two minutes, three minutes, five minutes, and ten minutes. In an example, the predetermined amount of time may be set by the user of the information handling system. Additionally, the display timeout timer may include two different settings or two different predetermined amounts of time. For example, the display timeout timer may be set to a first predetermined amount of time if the information handling system is plugged in to an alternating current (AC) power source, and may be set to a second predetermined amount of time if the information handling system is utilizing a battery. Thus, the first setting of the display timeout timer may be when the information handling system is plugged into the AC power source, and the second setting may be when the information handling system is utilizing a battery.

At block 316, an energy sample timer is started. In an example, the energy sample timer may include a predetermined amount of time between consecutive calculations of energy consumed by the display device. In certain examples, the predetermined amount of time for the energy sample timer may be any suitable amount of time including, but not limited to, an half of a second, one second, two seconds, four seconds, and five seconds.

At block 318, an amount of power drawn by the display device is measure or determined. In an example, the amount of power may be an instantaneous amount of power drawn by the display device or screen of the information handling system. At block 320, a total amount of energy consumed by the display device is calculated. The total amount of energy may be calculated in any suitable manner utilizing any suitable formula or set of operations. For example, the total amount of energy consumed by be calculated or determined by multiplying an amount of power by a length of time that power has been drawn. For example, any suitable device may determine a power curve based on one or more instantaneous amounts power drawn by the display device, and the amount of energy consumed over time may be estimated based on the instantaneous amounts of power. In an example, the instantaneous amounts of power may be stored as data for a power curve and the energy may be determined or estimated by an area under the power curve.

At block 322, a determination is made whether the user input is still idle. If the user input is not idle, the flow continues as stated above at block 302. However, if the user input is still idle, the flow continues at block 324 and a determination is made whether a total amount of energy consumed by the display device is greater than a threshold amount of energy. In an example, the threshold amount of energy may be any suitable amount of energy set by a user. For example, the threshold amount of energy may be set to any amount of energy including, but not limited to, 10 milli-Watt hours (mWh), 15 mWh, 20 mWh, and 30 mWh.

If the total amount of energy consumed is greater than the energy threshold, the display device is shut off at block 308, and the method ends at block 310. If the total amount of energy consumed is not greater than the energy threshold, a determination is made whether the display time has expired at block 326. In an example, the display time may be tracked by the display timeout timer as described above with respect to block 314.

If the display time has expired, the display device is shutoff at block 308, and the method ends at block 310. If the display time has not expired, a determination is made whether the energy sample timer has expired at block 328. If the energy sample timer has not expired, the flow continues as described above at block 326. However, if the energy sample timer has expired, the flow continues as described above at block 316.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a display device;
   a user input device; and
   a processor to communicate with the display device and with the user input device, the processor to:
   detect whether the user input device is in an idle state;
   in response to an initial detection of the user input device being in the idle state, continually determine a power consumption of the display device;
   while the power consumption is continually determined:
   gradually dim the display device at a first rate as the power consumption continues in the display device, wherein the gradual dimming is proportional to a total amount of energy consumed in the display device; and
   determine whether a predetermined amount of energy has been consumed by the display device; and
   in response to a predetermined amount of energy being consumed, turn off the display device.

2. The information handling system of claim 1, while the predetermined amount of energy has not been consumed, the processor further to:
   determine whether a timer timeout has expired; and
   in response to the timer timeout being expired, turn off the display device.

3. The information handling system of claim 1, while the predetermined amount of energy has not been consumed, the processor further to:
   determine whether a user is detected; and
   in response to the user not being detected, turn off the display device.

4. The information handling system of claim 1, wherein the gradual dimming is a linear reduction of a brightness of the display device.

5. The information handling system of claim 1, wherein the processor further to:
   determine whether a first threshold percentage of the predetermined amount of energy has been exceeded; and
   in response to the first percentage threshold being exceeded, dim the display device at a second rate.

6. The information handling system of claim 5, wherein the second rate is a logarithmic rate of dimming.

7. A method comprising:
   detecting, by a processor of an information handling system, whether a user input device is in an idle state;
   in response to an initial detection of the user input device being in the idle state, continually determining a power consumption of a display device of the information handling system;
   while the power consumption is continually determined:
   gradually dimming the display device at a first rate as the power consumption continues in the display device, wherein the gradual dimming is proportional to a total amount of energy consumed in the display device; and
   determining whether a predetermined amount of energy has been consumed by the display device; and
   in response to a predetermined amount of energy being consumed, turning off the display device.

8. The method of claim 7, while the predetermined amount of energy has not been consumed, the method further comprises:
   determining whether a timer timeout has expired; and
   in response to the timer timeout being expired, turning off the display device.

9. The method of claim 7, while the predetermined amount of energy has not been consumed, the method further comprises:
   determining whether a user is detected; and
   in response to the user not being detected, turning off the display device.

10. The method of claim 7, wherein the gradual dimming is a linear reduction of a brightness of the display device.

11. The method of claim 7, further comprising:
determining whether a first threshold percentage of the predetermined amount of energy has been exceeded; and
in response to the first percentage threshold being exceeded, dimming the display device at a second rate.

12. The method of claim 11, wherein the second rate is a logarithmic rate of dimming.

13. A non-transitory computer-readable medium including code that when executed by a processor performs a method, the method comprising:
detecting whether a user input device is in an idle state;
if a user input device is in an idle state, then monitoring power consumption of a display device;
gradually dimming the display device at a first rate as the power consumption continues in the display device, wherein the gradual dimming is proportional to a total amount of energy consumed in the display device; and
turning off the display device after a predetermined amount of energy has been consumed.

14. The non-transitory computer-readable medium of claim 13, wherein the method further comprises:
determining whether a timer timeout has expired; and
in response to the timer timeout being expired, turning off the display device.

* * * * *